(12) United States Patent
Buysschaert et al.

(10) Patent No.: US 10,194,219 B2
(45) Date of Patent: Jan. 29, 2019

(54) METHOD AND DEVICE FOR MAPPING A DATA STREAM INTO AN SDI CHANNEL

(71) Applicant: intoPIX s.a., Mont-Saint-Guibert (BE)

(72) Inventors: Charles Daniel Buysschaert, Brussels (BE); Thomas Denison, Gembloux (BE); Sébastien Lugan, Boissy-le-Châtel (FR); Gaël Rouvroy, Woluwe-Saint-Pierre (BE); Pascal Hubert Pellegrin, Wierde (BE)

(73) Assignee: Intopix S.A., Mont-Saint-Guibert (BE)

( * ) Notice: Subject to any disclaimer, the term of this patent is extended or adjusted under 35 U.S.C. 154(b) by 0 days.

(21) Appl. No.: 15/281,434

(22) Filed: Sep. 30, 2016

(65) Prior Publication Data
US 2017/0094374 A1    Mar. 30, 2017

(30) Foreign Application Priority Data

Sep. 30, 2015   (EP) ..................................... 15187787

(51) Int. Cl.
| | | |
|---|---|---|
| *H04N 21/854* | (2011.01) | |
| *H04N 21/6336* | (2011.01) | |
| *H04N 21/6379* | (2011.01) | |
| *H04N 21/2343* | (2011.01) | |

(Continued)

(52) U.S. Cl.
CPC ... *H04N 21/85406* (2013.01); *H04N 21/2343* (2013.01); *H04N 21/23602* (2013.01); *H04N 21/4342* (2013.01); *H04N 21/6336* (2013.01); *H04N 21/6379* (2013.01)

(58) Field of Classification Search
CPC ............. H04N 21/236; H04N 21/2343; H04N 21/434; H04N 21/85406; H04N 21/23602; H04N 21/4342; H04N 21/6336; H04N 21/6379
See application file for complete search history.

(56) References Cited

U.S. PATENT DOCUMENTS

| | | | | |
|---|---|---|---|---|
| 2002/0126988 | A1* | 9/2002 | Togashi ................. | H04N 5/783 386/205 |
| 2006/0239636 | A1* | 10/2006 | Sugiyama ............ | H04N 9/7921 386/306 |
| 2011/0013646 | A1* | 1/2011 | Said .................... | H04N 21/2343 370/465 |

FOREIGN PATENT DOCUMENTS

| | | |
|---|---|---|
| EP | 1 667 466 A1 | 7/2006 |
| WO | 00/24171 A1 | 4/2000 |

OTHER PUBLICATIONS

Tico Alliance: "TICO Alliance Moves Forward with SMPTE for Transporting UHD-4K over IP and SDI, Adds New Members and Shows Live 4K Demos at IBC"; Sep. 4, 2015.

(Continued)

*Primary Examiner* — Hunter B Lonsberry
(74) *Attorney, Agent, or Firm* — Finnegan, Henderson, Farabow, Garrett & Dunner LLP (57) ABSTRACT

The invention provides a method for mapping a data stream onto an SDI channel, said data stream comprising a sequence of m-bit words, a range of values from 0 to $2^{}n-1$ and from $2^{}m-2^{}n$ to $2^{}m-1$ being excluded values on said SDI channel. The method comprises the steps of grouping the words to be transmitted, detecting if at least one of the words of the group contains a number of MSB's equal to one, and then recoding these MSBs and adding a constant, in order that no excluded values are obtained. Supplementary bits signal groups that have been recoded.

15 Claims, 3 Drawing Sheets

(51) Int. Cl.
H04N 21/236 (2011.01)
H04N 21/434 (2011.01)

(56) References Cited

OTHER PUBLICATIONS

The Society of Motion Picture and Television Engineers: "SMPTE 274M-2008 SMPTE Standard for Television, 1920×1080 Image Sample Structure, Digital Representation and Digital Timing Reference Sequences for Multiple Picture Rates"; Jan. 29, 2008.
The Society of Motion Picture and Television Engineers:; "SMPTE 2047-2:2010—SMPTE Standard—Carriage of VC-2 Compressed Video over HD-SDI"; Jan. 12, 2010.
The Society of Motion Picture and Television Engineers: High Dynamic Range Electro-Optical Transfer Function of Mastering Reference Displays (SMPTE ST 2084:2014); Aug. 29, 2014.
The Society of Motion Picture and Television Engineers: "SMPTE Registered Disclosure Document: TICO Lightweight Codec Used in IP Networked or in SDI Infrastructures"; Apr. 2016.

\* cited by examiner

PRIOR ART

METHOD AND DEVICE FOR MAPPING A DATA STREAM INTO AN SDI CHANNEL

CROSS-REFERENCE TO RELATED APPLICATION

This patent application claims priority from European patent application 15187787.5, filed Sep. 30, 2015, which is hereby incorporated herein by reference.

FIELD OF THE INVENTION

The invention relates to a method and device for mapping a data stream onto an SDI channel.

DESCRIPTION OF PRIOR ART

The serial data interface (hereafter SDI) is a set of interfaces standardized by SMPTE (The Society of Motion Picture and Television Engineers) and defining the transmission and reception of data streams representing, e.g., video signals. An exemplary widely used format for coding video signals is the high definition HDTV 1080p format, having 1920 pixels per line, 1080 lines per frame. This format also includes horizontal and vertical synchronization data, resulting in a total of 2200 pixels per line and 1125 lines per frame. At 60 frames per second, and 20 bits per pixel, this produces a 2.97 Gbit/s data rate. The current version of the SDI standard, SMPTE ST 424:2012, is the 3G-SDI from year 2006 allowing data rates of 2.970 Gbit/s, and is designed for transmitting such HDTV 1080p signals, and other similar data streams.

Currently, there is a demand for images having higher definitions, and/or higher data rates, addressed by standards such as SMPTE ST 2081-10 (single link 6 Gbits/s 6G-SDI), SMPTE ST 425-5 (quad link 3 Gbits/s) or SMPTE ST 2082-10 (single link 12 Gbits/s 12G-SDI), requiring 6 Gbits/s data rates and 12 Gbits/s data rates channels. Obviously, such data rates cannot be transmitted across a single 3G-SDI channel, yet many companies have an existing 3G infrastructure that would be too costly to upgrade. In order to meet the single 3G-SDI limitation of 2.970 Gbit/s, these video data streams must be submitted to a compression step using a codec such as TICO, having a compression rate sufficient for allowing the higher data rate to be reduced at or below the data rate admitted by the available data channel. These compression ratios are 2:1 and 4:1 respectively. The same needs arise when transmitting 3G-SDI data onto a single 1.5G-SDI channel, or Quad link 12 Gbits/s onto a single 12G-SDI channel.

The current constraint and a problem to be addressed is that the SDI standard as specified in SMPTE ST 274:2008 and SMPTE ST 292 prohibits the transmission of eight synchronization code values (000h to 003h and 3FCh to 3FFh). These code values are used in the timing reference areas SAV (start of active video) and EAV (end of active video) as control characters, but are excluded in the active picture, ancillary data and blanking level areas of the signal. Document SMPTE 274M-2008 discusses other examples at paragraph 8.10 and table 3. For 8-bit systems, 10-bit systems and 12 bit systems, the prohibited codes are as follows:

|  | 8-bit system | 10-bit system | 12-bit system |
|---|---|---|---|
| Upper region | $FF_h$ (255) | $3FC_h$-$3FF_h$ (1020-1023) | $FF0_h$-$FFF_h$ (4080-4095) |
| Lower region | $00_h$ (0) | $000_h$-$003_h$ (0-3) | $000_h$-$00F_h$ (0-15) |

In order to solve this constraint, the standard SMPTE ST 2047-2:2010 "Carriage of VC-2 Compressed Video over HD-SDI" defines a means of mapping data onto a single HD SDI link, based upon the SMPTE ST 292 data structure, to support the transport of 1920×1080/50/P, 1920×1080/59.94/P (60/1.001), and 1920×1080/60/P systems. As these systems require a raw uncompressed data capacity twice that of SMPTE ST 292, a compression is required for reducing the data rate. VC-2 mezzanine compression provides a solution by transporting the compressed video data in the least-significant 8 bits of the (10-bit) video words. The solution adopted in this standard for preventing that the excluded values be transmitted is that the eight bit pixel values are transmitted as 10 bit values where 00 000000 xx is modified to 01 000000 xx and
11 111111 yy is modified to 10 111111 yy That is, the bit below the most significant bit is modified when the unmodified value is one of the excluded values. This scheme is simple and easy to implement both at the sender and at the receiver, but has the drawback that two additional bits must be transmitted in addition to the eight useful bits, resulting in an overhead of 25%. This high overhead must be compensated by a higher compression ratio from the codec, which at 4:1 ratio may have a significant impact on image quality. If the required compression ratio is 4.5:1 or 5:1, the impact on image quality is even worse.

Document WO0024171 discloses a method for processing audio or video digital information to avoid a forbidden data pattern. In this method, one obtains an encoding key, one encodes the digital words and one transmits the key information and the encoded information. The process is such that no forbidden data pattern is transmitted in the key information or in the encoded information. This method requires a complex processing for coding and decoding, and the transmission of the key information leads to a substantial overhead.

Document EP1667466 discloses a method and an apparatus for encoding or decoding two digital video signals arranged in a single-video signal path, e.g. an SDI or HDSDI format video signal path. This method avoids the transmission of forbidden values by adding a constant to the words containing forbidden values. The method relies on the structure of the dual video signals, and is not adapted to a general data stream.

SUMMARY OF THE INVENTION

It is an object of the present invention to provide a method and device for mapping a data stream into an SDI channel, where excluded values are not transmitted and having a better throughput than the prior art solution.

The invention is defined by the independent claims. The dependent claims define advantageous embodiments. In the following text and the claims, x to the $y^{th}$ power is represented as x**y.

According to a first aspect of the invention there is provided a method for mapping a data stream onto an SDI channel, said data stream comprising a sequence of m-bit words, a range of values from 0 to (2n)−1 and from 2m−2n to (2m)−1 being excluded values on said SDI channel. The method comprises the steps of a) grouping words of said sequence of m-bit words in a group of $2^{**}g$ words, g being comprised of a number between 0 and m−1;
b) detecting if among said group of $2^{**}g$ words, at least one has g+1 MSB bits equal to 1;
c) if said condition is true storing a supplementary bit equal to 1 and recoding said g+1 MSB bits of said $2^{**}g$ words by replacing said $(g+1)^*2^{**}g$ bits having a value x by an equal number of bits having a value y through a function y=f(x) applying bijectively the set of possible values of x to a disjoint set of values y of $(g+1)^*2^{**}g$ bits;
d) if said condition is false, storing a supplementary bit equal to 0;
e) repeating steps a-d a number k of times;
f) grouping said k supplementary bits into the LSBs of a number j of m-bit words wherein j is the integer part of (k+m−2)/(m−1);
g) performing an addition modulo $2^{**}m$ of a value s to said number j of m-bit words, and to said $k^*2^{}g$ m-bit words, where s is comprised between 4 and $2^{}(m-1)$;
h) sending said number j of m-bit words and said $k^*2^{**}g$ m-bit words over said SDI channel.

The combination of step c) and step g) ensures that no excluded value is being produced. The function f is selected in order that the set of possible values of x, which is a subset of the values of $(g+1)^*2^{**}g$-bit words is applied into another subset of the values of $(g+1)^*2^{**}g$-bit words, the two subsets being disjoint, i.e no element of the first appearing in the other. Under these conditions, the function f can be inverted for finding a value of x corresponding to a value of y. The value of s may be selected as a power of 2. Excluded values are either the values where all m−n highest significant bits of the words to be transmitted are zero bits (small values) or the values where all m−n most significant bits of the words to be transmitted are '1' bits (large values). A practical example is the case where m=10 and n=2. In this case, 4 small values (0, 1, 2, 3) and 4 large values (1020, 1021, 1022, 1023 decimal) are excluded. The invention is not limited to these values of m and n but covers a broader range of values, including values of n larger than 2. However, it can be seen that when n reaches m−1, all values in the range of m-bit values are excluded, which makes no technical sense, therefore small values of n (1, 2, 3, 4, 5) are preferred.

In order to avoid the forbidden values, when the condition of step b) is satisfied, the invention recodes the g+1 most significant bits (MSB) of each m-bit word in said group of 2g words. These (g+1)*2g bits are grouped in a predetermined order to form a binary number having a value x. The value of x depends on the order chosen for grouping these bits. However, the invention does not specify the order in which these (g+1)*2g bits must be arranged. Indeed, any order would meet the goal of the invention, provided that the same order is used at the decoder. Also, the function f(x) mapping the value x to a value y may be any function mapping the subset of values of (g+1)*2g bits meeting condition b) to a disjoint set of values (i.e. values not meeting condition b).

Steps a-d are repeated a number k of times, preferably on successive groups of successive 2g words from said sequence of m-bit words of said data stream. However, other groupings and other orders may be considered in the invention.

The re-coding of data produces one extra supplementary bit for every group of 2g words, this supplementary bit being one if recoding occurred, and zero if recoding did not occur. Those supplementary bits are transmitted to the decoder in order to rebuild the original data stream, since they specify for each block of $2^{**}g$ words whether this block had forbidden values and required re-coding. These supplementary bits must be grouped to form m-bit words that are transmitted over the SDI channel, without producing forbidden values. In order to ensure that the m-bit words containing the supplementary bit do not comprise forbidden values, at least one zero MSB must be reserved in each of these words. The claimed number j words achieves this goal.

Claim 1 does not constrain how those supplementary bits are regrouped and inserted into the output data stream; it just specifies they are regrouped k bits at a time. However one skilled person will regroup those k bits in as few m-bit words as possible to minimize the throughput overhead; one way to achieve this optimum is simply to add a '0' bit as MSB to ensure the produced word is within the subrange [0, $2^{**}(m-1)-1$], and will be excluded from the forbidden values in step g. Grouping fewer supplementary bits and adding more '0' bits in the MSB is also valid, but less efficient.

The general formula to calculate how many words are necessary to store the k supplementary bits is given in step g of claim 1, namely (k+m−2)/(m−1). This is actually the real value k/(m−1) rounded to the upper integer, and the division itself represents how many (m−1)-bit words are necessary to store the k supplementary bits, since storing m−1 supplementary bit per m-bit word is the optimal way of producing as few output words as possible, while making sure they do not yield forbidden values.

It is not possible to group 10 supplementary bits into one 10-bit output word, because there is no guarantee its value will never be in the forbidden subrange. It is possible to store at most 9 bits in one output word, by carefully choosing the MSB. Then one supplementary bit still needs to be output, in a second output word, hence j=2 which is as expected. It is however not optimal; it would be possible to store as many as 18 supplementary bits into two output 10-bit words, and indeed if k=18 and m=10, the formula yields j=2, as expected.

The value of s is preferably comprised between $2^{}n$ and $(2^{}m-2^{}n)-\Sigma(2^{}(m-1-i))$, where the sum is performed for i going from zero to g.

A possible mapping and function f of step c is as follows: said recoding step of step c) comprises
When g=0, if the most significant bit of said word is 1, it is replaced by a zero;
When g>0,
  i. determine w being the number of words of said group having g+1 MSBs equal to 1, and the indices of the words in said group;
  ii. if w is less than $2^{**}g/g$ then
    1. coding w in bits of y with a code of length w, composed of (w−1) bits '1' and one bit '0' when w>1, or one bit 0 when w=1;
    2. coding in w*g bits of y, the indices of the w words containing g+1 MSBs equal to 1, each index being coded with g bits;
  iii. if w is larger than or equal to $2^{**}g/g$ then
    1. coding in $2^{**}g$ bits of y a 1 for the w words having g+1 MSBs equal to one and 0 otherwise;
  copying the MSBs of the words not having g+1 MSBs equal to 1, if any, in bits of y
  if there are unused (don't-care) bits in y, they are set to 0.
The (g+1)*$2^{**}g$ bits of x are recoded in (g+1)*$2^{}g$ bits of y. The arrangement of bits in y may be as specified above or different, provided sender and receiver use same arrangement. In step ii)1, the value of w is encoded in w bits of y in unary coding, i.e 1 is coded as 0, 2 as 10, 3 as 110, 4 as 1110, etc. In step ii)2, the indices of the w words containing g+1 MSBs equal to 1 are their sequence number from 1 to 2g in the group. Each of these sequence numbers are coded in g bits of y, for a total size of w*g bits.

Alternatively, said step c) comprises using a table comprising a value of y for each successive of the values of x, for obtaining the value of y corresponding to a value of x. One method for building such a table is to list all values of x, and next to a value of x, the successive values of the (g+1)*2**g-bit words not being part of the first list.

Preferably, m equals 10, i.e. one processes 10-bit words.

Preferably, n equals 2, i.e. the excluded values are 0 to 3 and 1020 to 1023, when using 10-bit words.

Preferably, g equals 2, i.e. words are grouped four by four.

Preferably, k equals 9, i.e. the supplementary bits of nine groups are packed in one word.

Preferably, s equals 64, i.e. one adds 64 modulo 1024 to the recoded and non-recoded words, and to the words containing the supplementary bits.

According to a second aspect of the invention there is provided a method for unmapping an SDI data stream onto an unmapped data stream, said data stream having been produced by the method of the invention, comprising the steps of
  a) receiving said j m-bit words containing supplementary bits over said SDI channel said value of j being the value used in the method for mapping of the invention ;
  b) receiving said k*2**g m-bit words over said SDI channel, said values of k and g being respectively the values used in the method for mapping of the invention;
  c) performing subtraction modulo 2**m of a value s from said j m-bit words, and from said k*2**g words, said value s being the value used in the method for mapping of the invention;
  d) repeating steps e-g a number k of times on successive words of said SDI data stream;
  e) grouping words of said sequence of m-bit words in a group of 2**g m-bit words;
  f) if supplementary bit corresponding to said grouping is equal to zero, copying said group of 2**g m-bit word to said unmapped data stream;
  g) if supplementary bit corresponding to said grouping is equal to 1, replacing said (g+1)*2g bits having a value y by an equal number of bits having a value x through the function x=f−1(y) and copying said group of 2**g m–bit word to said unmapped data stream.

According to a third aspect of the invention there is provided a device for mapping a data stream onto an SDI channel comprising a controller programmed for performing and/or hardware designed for performing the mapping method of the invention.

According to a fourth aspect of the invention there is provided a device for unmapping a data stream, said data stream having been produced by a mapping device of the invention comprising a controller programmed for performing and/or hardware designed for performing the unmapping method of the invention.

According to a fifth aspect of the invention there is provided a use of a compression codec and a device according to the invention for transmitting 4K UHDTV frames at 60 FPS (frame per second) over a single 3G-SDI link.

The compression codec is preferably a TICO codec which is well suited for 4 to 1 compression ratio necessary in this application.

According to a sixth aspect of the invention there is provided a use of a decompression codec and a device according to the invention for receiving UHD frames at 60 FPS over a single 3G-SDI link.

The decompression codec is preferably a TICO codec. The compression codec of the sender and the decompression codec of the receiver must correspond.

SHORT DESCRIPTION OF THE DRAWINGS

These and further aspects of the invention will be explained in greater detail by way of example and with reference to the accompanying drawings in which.

FIF. 3 is an example of a group of 2g words, wherein one word has g+1 MSB bits equal to 1.

The drawings of the figures are neither drawn to scale nor proportioned. Generally, identical components are denoted by the same reference numerals in the figures.

DETAILED DESCRIPTION OF EMBODIMENTS OF THE INVENTION

Figure 1:
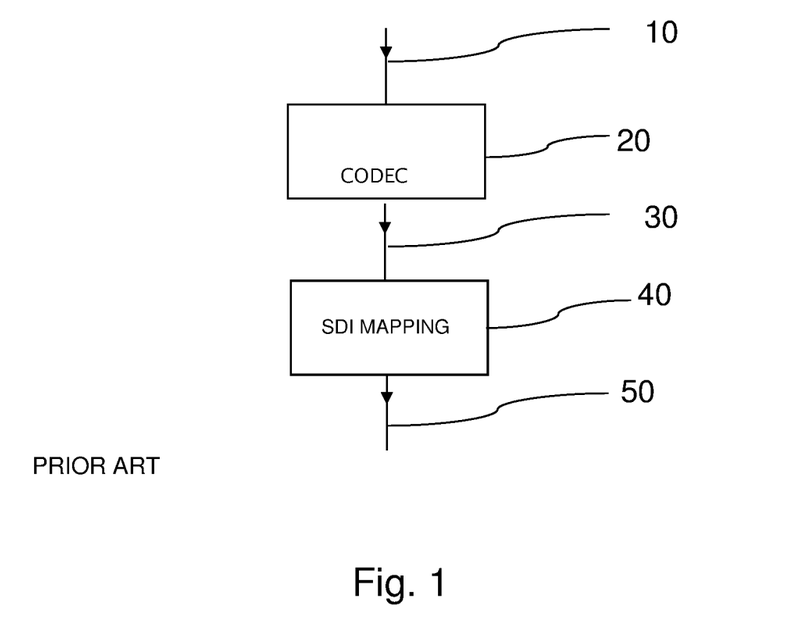
FIG. 1 is a schematic representations of a known device for compressing and mapping a data stream into an SDI channel.

FIG. 1 is a schematic representation of a known device for compressing and mapping a data stream into an SDI channel. The input data stream 10 is a data stream, e.g. a video data stream, at a bit rate higher than 2.97 Gbits/s. A codec 20 compresses the input data stream at a compression rate such that the compressed data stream 30 plus the additional data provided by the SDI mapping device 40 produces an SDI data stream 50 that meets the capacity of the SDI channel. As discussed before, the mapping method of SMPTE ST 2047-2-2010 adds an overhead of 25% to the compressed data stream 30, and therefore requires a higher compression rate from the codec 20, and hence a loss of image quality.

Figure 2:
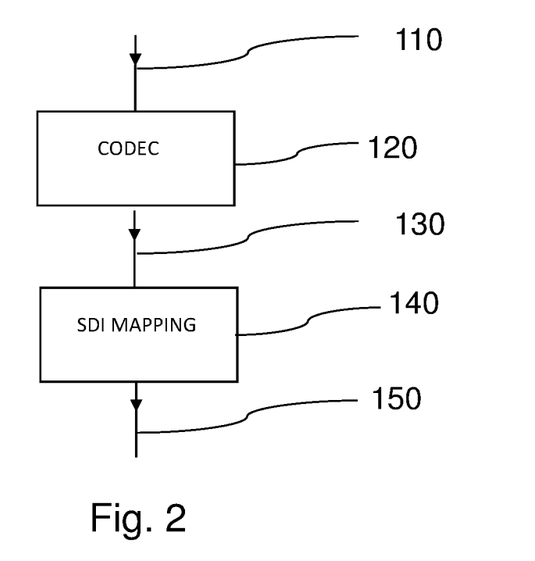
FIG. 2 is a schematic representation of a device for compressing and mapping a data stream into an SDI channel, comprising a device for mapping according to the invention.

FIG. 2 is a schematic representation of a device for compressing and mapping a data stream into an SDI channel, comprising a device for mapping 140 according to the invention. The input data stream 110 is a data stream, e.g. a video data stream at a bit rate higher than 2.97 Gbits/s. A codec such as the TICO codec 120 compresses the input data stream at a compression rate such that the compressed data stream 130 plus the additional data provided by the SDI mapping device 140 meet the capacity of the SDI data stream 150. The difference between the device for mapping 140 of the invention and the device for mapping of the prior art 40, is that the device for mapping of the invention adds a much smaller overhead to the data rate, and therefore requires a lower compression rate from the codec, and hence produces a better image quality. When the data stream is a video data stream according to SMPTE ST 274:2008 or SMPTE ST 292, the data to be compressed are the data contained in the active area, i.e., the "Digital Active Line" part of the data stream.

Figure 3:
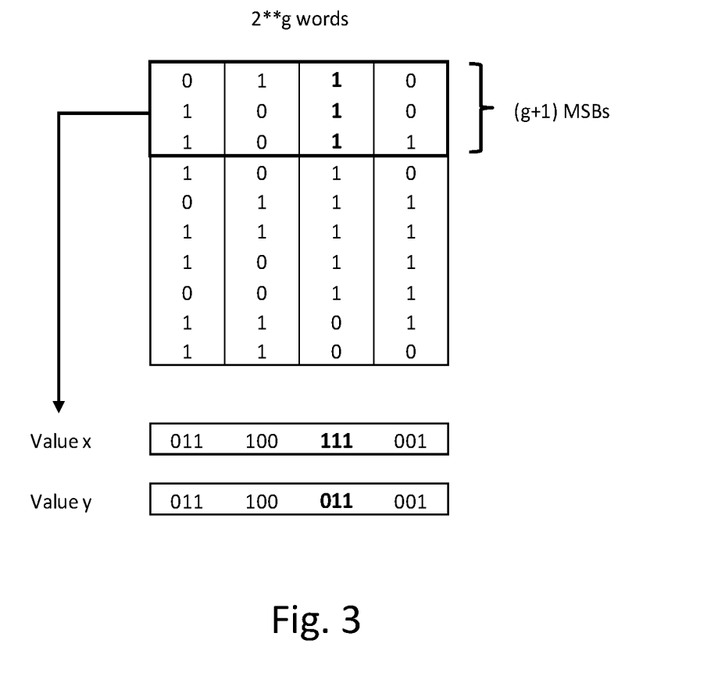

FIG. 3 illustrates steps b) and c) of the method, with an example where g=2. Four 10-bit words are grouped and the three MSBs of these four words (the rectangle in bold in FIG. 3) are tested for the occurrences of three ones. This is the case for the third word, so recoding must occur. The 12 MSBs are regrouped in one 12-bit word x. The order in which this regrouping occurs is irrelevant, but the most straightforward order (sequential) is illustrated in the example. A mapping is selected for applying the set of all possible values of x, all having at least a group of three bits equal to one, to a disjoint set of values of y (none having this feature). In the example, the mapping selected only changes one bit in the third group of three bits. The bits of y are then recoded at their respective location in the rectangle in bold.

Figure 4:
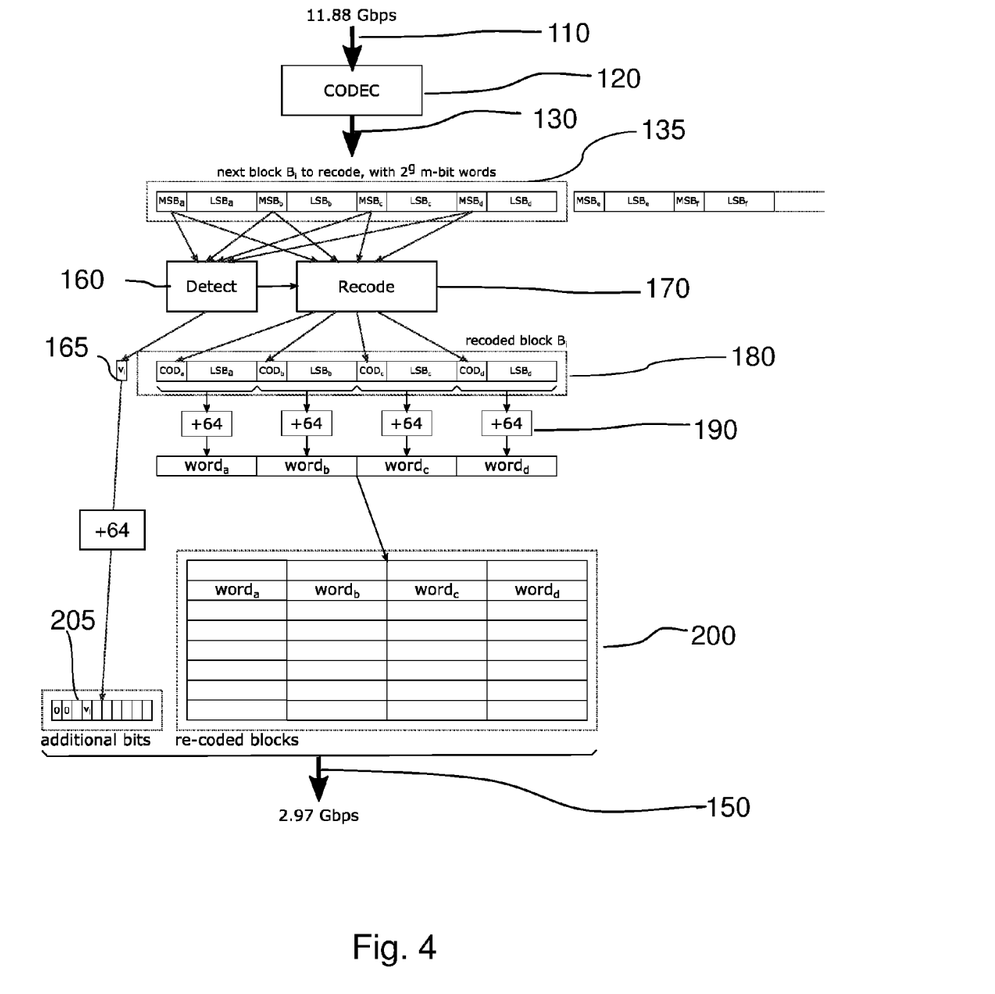
FIG. 4 is a schematic representation of a method for mapping a data stream into an SDI channel, according an embodiment of the invention.

FIG. 4 is a schematic representation of a method for mapping a data stream into an SDI channel, according an embodiment of the invention. Elements already described in FIG. 2 have the same reference numbers. Block 135 shows the grouping of m-bit words in groups of 2**g words. The g+1 most significant bits (MSB's) and the (m−g−1) least significant bits (LSB's) of these words are considered separately. Block 160 detects if one of these words has its g+1 MSBs equal to 1. If this condition is true, a supplementary bit 165 is sored as '1' and block 170 performs a recoding of the MSBs of all words of the group into block 180. The LSBs are simply copied from block 135 to block 180.If this condition is false, a supplementary bit 165 is stored as '0', and block 135 is simply copied to block 180, without recoding. The recoding is explained in more detail below. In step 190, a constant is added to each word of the group. The same constant is added to the supplementary bits (the constant, s, is equal to 64 in the figure). These operations are performed a number j of times (j=8 in the figure), and the resulting words are grouped in block 200. The corresponding supplementary bits are grouped in supplementary word 205, and both block 205, and block 200 are sent over the SDI channel. In the example, k=8, and 8 supplementary bits have been generated. These eight supplementary bits can fit in the 8 LSBs of one 10-bit word, i.e. j=1, without producing a forbidden value. Nine supplementary bits would also allow having a MSB equal to zero. For k=10 to k=18, one would need 2 10-bit words, i.e. j=2, and for k=19 to k=27, one would need 3 10-bit words (j=3) etc.

The method of the invention involves the grouping of words of the compressed data stream 130 in a number 2**g of groups of words. Examples will be given where the groups involve one, two, four and eight words, i.e. g=0, 1, 2 and 3. In these examples, the case m=10 (10-bit words) and n=2 is discussed, i.e. the excluded values are 0 to 3h and 3FCh to 3FFh, but the skilled person will understand how to apply the invention to other values of m and n. In the pseudo code, comments are between /* and */ and make the link to the general method of claim 2.

EXAMPLE 1

Grouping by One

The m-bit words are treated each separately (i.e. g=0) If the most significant bit is 1, it is replaced by a zero and a supplementary bit equal to 1 is stored. Else, a supplementary bit equal to 0 is stored. This can be expressed by the pseudo-code

```
If bit 9='1',
    Supplementary bit = 1
    bit 9 <= '0'
else
    Supplementary bit = 0
```

This implies that values between 0 and 2(m−1)-1 are produced i.e. between 0 and 511 when m=10. A value of s is then added modulo 2m. The value of s may be comprised of a number between 4 and 508. This ensures that the range 0-511 is transported to 4-515 with s=4 and 508-1019 for s=508. In both these limits, the forbidden values 0-3 and 1020-1023 are absent. The combination of the replacement of the most significant bit together with the addition of s modulo 2**m ensures that none of the excluded values are produced. This process is repeated a number k of times. The value of k may advantageously be chosen as nine, in order that a single 10-bit word of supplementary bits may be used without excluded values. In this case, the transmission of 9 words requires 10 words, i.e. an overhead of 11%.

EXAMPLE 2

Grouping by Two

The m-bit words are treated two by two (i.e. g=1). If at least one of the two words has '11' as MSB, a supplementary bit of 1 is stored, else a supplementary bit of 0 is stored. According to the invention, the two most significant bits of these two words, i.e. four bits, must be recoded. Among the 16 possible values of these four bits, 7 have at least two MSBs as '11' and must be recoded. It is a simple matter to design a table where these 7 values are recoded into 7 different values selected among the 9 remaining values having no '11' MSBs. This may be done e.g. by recoding each of the values 3, 7, 11, 12, 13, 14, 15 (in binary 0011, 0111, 1011, 1100, 1101, 1110 and 1111 respectively) to the first seven 'not to be recoded values' 0,1, 2, 4, 5, 6, 8. This operation from the first set of seven values to the second set of seven values is bijective, and can be inverted easily in the unmapping operation at the receiver. This can be performed in a table-driven way, both at the sender and at the receiver.

Another example of performing the recoding can be performed according to the pseudo-code, where msb_0 are the two most significant bits of the first word, msb_1 are the two most significant bits of the second word, and bits of the two ten-bit words are numbered from 0 to 19, bit 19 being the MSB of the first word and bit 0 the LSB of the last word

```
If (msb_1='11' || msb_0='11'), then
    Supplementary bit = 1
    If we have only one msb_X='11'        /* w=1*/
        bit 19 <= '0'                      /* variable length code for '1' */
        bit 18 <= 'X' (position of the msb_X = '11')
        bit 9..8 <= value of the other msb_X (that is != '11')
    If we have two msb_X='11'              /* w=2 */
        bit 19..18 <= '10'                 /* variable length code for '2' */
        bit 9..8 <= '00'                   /* don't care bits */
else
    Supplementary bit = 0
```

The resulting values are comprised between 0 and 767. The value of s may be comprised between 4 and 252. This ensures that the range 0-767 is transported to 4-771 with s=4 and 252-1019 for s=767. In both these limits, the forbidden values 0-3 and 1020-1023 are absent. The result of this process is that neither bits 19 . . . 18 nor bits 9 . . . 8 are ever equal '11'. This may be performed with a very small lookup-table converting 4 bits to 5 bits (4 recoded bits plus the supplementary bit). This case results in an overhead of 5.56%.

EXAMPLE 3

Grouping by Four

The m-bit words are treated four by four (i.e. g=2). If at least one of the four words has '111' as MSBs, a supplementary bit of 1 is stored, else a supplementary bit of 0 is stored. According to the invention, the three most significant bits of these four words, i.e. twelve bits must be recoded. Among the 4096 possible values of these four bits, 1695 have at least three MSBs as '111' and must be recoded, and 2401 (i.e. 7**4) have no three MSBs as '111' It is a again a simple matter to design a table where the 1695 values are recoded into 1695 different values selected among the 2401 remaining values having no '111' MSBs. This may be performed in various ways including the method of example 2. Also the pseudo code outlined below, and using similar notations to example 2 may be used.

```
If (msb_11='111' || msb_10='111' || msb_01='111' || msb_00='111'), then
    Supplementary bit = 1
    If we have only one msb_X='111'                    /* w=1 */
        bit 39 <= '0'                                  /* variable length code for '1' */
        bits 38..37 <= 'X' (position of the msb_X = '111')
        bits 29..27, 19..17, 9..8 <= value of the other msb_X (that are != '111')
    If we have two msb_X='111'                         /* w=2 */
        bits 39..38 <= '10'                            /* variable length code for '2' */
        bits 37,29 <= 'X1' (position of the highest msb_X = '111')
        bits 28..27 <= 'X0' (position of the lowest msb_X = '111' (X0 != '11'))
        bits 19..17, 9..8 <= value of the other msb_X (that are != '111')
    If we have three or more msb_X='111'               /* w=3 */
        bits 39..37 <= '110'                           /* variable length code for '3' */
        bits 29 <= '0'
        bits 28 <= '1' if msb_11 = '111' else '0'
        bits 27 <= '1' if msb_10 = '111' else '0'
        bits 19 <= '0'
        bits 18 <= '1' if msb_01 = '111' else '0'
        bits 17 <= '1' if msb_00 = '111' else '0'
        bits 9..7 <= value of the other msb_X (that is != '111')'
else
    Supplementary bit = 0
```

The resulting values are comprised between 0 and 895 (i.e. 512+256+128-1). The value of s may be comprised between 4 and 124. This ensures that the range 0-895 is transported to 4-899 with s=4 and 124-1019 for s=895. In both these limits, the forbidden values 0-3 and 1020-1023 are absent. This operation is also bijective, and can be inverted easily in the unmapping operation at the receiver. This can be performed in a table-driven way, both at the sender and at the receiver.

In a preferred embodiment of the invention, the number k of groups of four words is 9. With this choice, the nine supplementary bits may be coded in one 10-bit words, and the transmission of 4X9 words will require the sending of 37 words, i.e. an overhead of 1/36 or 2.8%. Other number of groups of four words may be selected (i.e. other values of k) in order that a number of codec output words fits easily within the size of the group of words.

EXAMPLE 4

Grouping by Eight

The m-bit words are treated eight by eight (i.e. g=3). If at least one of the eight words has '1111' as MSBs, a supplementary bit of 1 is stored, else a supplementary bit of 0 is stored. According to the invention, the four most significant bits of these eight words, i.e. thirty-two bits must be recoded. Among the 232 possible values of these four bits, 1 732 076 671 have at least four MSBs as '1111' and must be recoded, and 2 562 890 625 (i.e. 158) have no four MSBs as '1111' A table may be designed, but in this case the pseudo code outlined below, and using similar notations to example 2 is the preferred solution.

```
If (msb_111='1111' || msb_110='1111' || msb_101='1111' || msb_100='1111' ||
msb_011='1111' || msb_010='1111' || msb_001='1111' || msb_000='1111'),
then
    Supplementary bit = 1
    If we have only 1 msb_X='1111'                     /* w=1 */
        bit 79 <= '0'                                  /* variable length code for '1' */
        bits 78..76 <= 'X' (position of the msb_X = ='1111')
        bits 69..66,59..56,49..46,39..36,29..27, 19..17, 9..8 <=
            value of the other msb_X (that are != '1111')
    If we have 2 msb_X='111'                           /* w=2 */
        bits 79..78 <= '10'                            /* variable length code for '2' */
        bits 77..76,69 <= 'X1': position of the highest msb_X = '1111'
        bits 68..66 <= 'X0' : position of the lowest msb_X = '1111'(X0 is != '111')
        bits 59..56,49..46,39..36,29..27, 19..17, 9..8 <=
            value of the other msb_X (that are != '1111')
    If we have 3 msb_X='1111'                          /* w=3*/
        bits 79..77 <= '110'                           /* variable length code for '3' */
        bit 76 <= '0'                                  /* don't care bit */
        bit 69 <= '1' if msb_111 = '1111'else '0'
```

```
    bit 68   <= '1' if msb_110 = '1111' else '0'
    bit 67   <= '1' if msb_101 = '1111' else '0'
    bit 66   <= '1' if msb_100 = '1111' else '0'
    bit 59   <= '1' if msb_011 = '1111' else '0'
    bit 58   <= '1' if msb_010 = '1111' else '0'
    bit 57   <= '1' if msb_001 = '1111' else '0'
    bit 56   <= '1' if msb_000 = '1111' else '0'
    bits 49..46, 39..36, 29..27, 19..17, 9..8 <=
                value of the other msb_X (that are != '1111')
If we have 4 or more msb_X='1111'            /* w=4 or more */
    bits 79..76 <= '1110'                    /* variable length code for '4' */
    bit 69   <= '0'
    bit 68   <= '1' if msb_111 = '1111' else '0'
    bit 67   <= '1' if msb_110 = '1111' else '0'
    bit 66   <= '1' if msb_101 = '1111' else '0'
    bit 59   <= '0'
    bit 58   <= '1' if msb_100 = '1111' else '0'
    bit 57   <= '1' if msb_011 = '1111' else '0'
    bit 56   <= '1' if msb_010 = '1111' else '0'
    bit 49   <= '1' if msb_001 = '1111' else '0'
    bit 48   <= '1' if msb_000 = '1111' else '0'
    bit 47..46 <= '00'
    bits 39..36, 29..27, 19..17, 9..8 <=
                value of the other msb_X (that are != '1111')
else
    Supplementary bit = 0
```

The resulting values are comprised between 0 and 959 (i.e. 512+256+128+64-1). The value of s may be comprised between 4 and 60. This ensures that the range 0-959 is transported to 4-963 with s=4 and 60-1019 for s=60. In both these limits, the forbidden values 0-3 and 1020-1023 are absent. In a preferred embodiment of the invention, the number k of groups of four words is 9. With this choice, the nine supplementary bits may be coded in one 10-bit words, and the transmission of 8X9 words will require the sending of 73 words, i.e. an overhead of 1/72 or 1.38%

In a typical embodiment, 10-bit words are grouped by four (g=2) and repeated 16 times (k=16), being 640 bits in total. This leads to the production of 16 supplementary bits. These supplementary bits are coded in the 8 LSB bits of two supplementary 10-bit words, and the value s is added (thereby avoiding forbidden values). This leads to 660-bit packets in the output stream, i.e. an overhead of 20/640, i.e. 3,125%

The device of the invention may be implemented in an FPGA (Field-Programmable Gate Array) device, using a small amount of embedded memory to bufferize the words whose MSB's need remapping by the method of the invention, a ROM (Read-Only Memory) table to implement the recoding, and the necessary data path, synchronization and control logic to perform the mapping of incoming words to outgoing words to transmit over an SDI channel. Since the buffer size is small and the control logic is easy to implement, together with the use of a light-weight and low-latency codec such as TICO, the design footprint is small enough to allow it being added in an FPGA that is already used to host the video-to-SDI interface.

The method and device of the invention provides a solution having a lower overhead than the known solutions. The invention provides a solution with a very low latency impact on the transmitted video stream. When using the solution of example 3, with k=9, 4*9 =36 words must be treated as a whole and thus a 36-cycle latency is introduced in the transmission chain, which is negligible in this context. The invention presents a low gate count when implemented in an FPGA or in an ASIC, and small code footprint when realized in a software implementation. The invention processes groups of 2**g words independently and thus any error in the transmission between the mapping and unmapping operations only impacts one group, without consequences on the other groups. The recoding according to the invention allows the recoding of the MSBs of a group of words in the same number of bits as the original bits to be recoded, with a single supplementary bit for each group of words, informing if recoding was performed or not.

The present invention has been described in terms of specific embodiments, which are illustrative of the invention and not to be construed as limiting. More generally, it will be appreciated by persons skilled in the art that the present invention is not limited by what has been particularly shown and/or described hereinabove. More specifically, the invention has been described in a system where the MSBs of the words are analysed and recoded if needed, and then an addition modulo 2**m is performed. From the present description, the skilled person will know how to perform the invention in a system where the LSBs of the word words are transmitted MSB first, and the MSB of excluded values are recoded. However, the invention applies as well in a system where the words are transmitted LSB first, and the LSB of excluded values are recoded.

Reference numerals in the claims do not limit their protective scope. Use of the verbs "to comprise", "to include", "to be composed of", or any other variant, as well as their respective conjugations, does not exclude the presence of elements other than those stated. Use of the article "a", "an" or "the" preceding an element does not exclude the presence of a plurality of such elements.

The invention may also be described as follows: a method for mapping a data stream onto an SDI channel, said data stream comprising a sequence of m-bit words, a range of values from 0 to 2n−1 and from 2m−2n to 2m−1 being excluded values on said SDI channel. The method comprises the steps of grouping the words to be transmitted, detecting if at least one of the words of the group contains a number of MSB's equal to one, and then recoding these MSBs and adding a constant, in order that no excluded values are obtained. Supplementary bits signal groups that have been recoded. The invention provides a simple and efficient method for transforming a data stream in order that forbidden values are absent in the SDI channel.

The invention claimed is:

1. A method for mapping, by a mapping controller, a video data stream onto a serial data interface channel, wherein the video data stream represents compressed video data output by an encoder and wherein the video data stream comprises a sequence of m-bit digital words, a range of values from 0 to $(2n)-1$ and from $2m-2n$ to $(2m)-1$ being excluded values on the channel, the method comprising:
   receiving the video data stream from the encoder;
   grouping data of the sequence of m-bit digital words into a group of $2**g$ digital words, wherein g is between 0 and m−1;
   detecting, by the mapping controller, a first condition when at least one digital word of the group of $2**g$ digital words has g+1 most-significant bits (MSB bits) equal to 1;
   if the first condition is detected by the mapping controller, the mapping controller storing in memory a supplementary bit equal to 1 and recoding the g+1 MSB bits of said the $2**g$ digital words by replacing $(g+1)*2**g$ bits having a value x by an equal number of bits having a value y by mapping the set of possible values of x to a disjoint set of values y for each of the $(g+1)*2**g$ bits, where each x value is mapped to a different y value;
   if the first condition is not detected by the mapping controller, the mapping controller storing in memory a supplementary bit equal to 0;
   repeating the grouping, the detecting of the first condition and the storing for k times to thereby store k supplementary bits;
   grouping the k supplementary bits into the least-significant bits (LSB bits) of a number j of m-bit digital words, wherein j is the integer part of $(k+m-2)/(m-1)$;
   performing an addition modulo $2**m$ of a value s to the number j of m-bit digital words, and to $k*2g$ m-bit digital words, where s is between $2n$ and $(2m-2n)-\Sigma(2**(m-1-i))$, where the sum is performed for i ranging from zero to g; and
   outputting the number j of m-bit digital words and the $k*2**g$ m-bit digital words over the channel.

2. A method according to claim 1 wherein the recoding comprises:
   when g=0, if the most significant bit of the digital word is 1, replacing the bit by a zero;
   when g>0,
      determining w being the number of digital words of the group having g+1 MSB bits equal to 1; and
      if w is less than $2**g/g$, then:
         coding w in bits of y with a code of length w, composed of (w−1) bits 1 and one bit 0 when w>1, or one bit 0 when w=1; and
         coding in w*g bits of y the indices of the w digital words containing g+1 MSB bits equal to 1, each index being coded with g bits; and
      if w is larger than or equal to $2g/g$, then coding in $2g$ bits of y a 1 for the w digital words having g+1 MSB bits equal to one and 0 otherwise; and
   copying the MSB bits of the digital words not having g+1 MSB bits equal to 1, if any, in bits of y, else code '0' bits in y.

3. A method according to claim 1 wherein the recoding comprises using a table comprising a value of y for each successive of the values of x, for obtaining the value of y corresponding to a value of x.

4. A method according to claim 1, wherein m equals 10.
5. A method according to claim 1, wherein n equals 2.
6. A method according to claim 1, wherein g equals 2.
7. A method according to claim 1, wherein k equals 9.
8. A method according to claim 1, wherein s equals 64.

9. A method for unmapping, by an unmappinq controller, a video data stream from a serial data interface channel, wherein the video data stream represents compressed video data, wherein the video data stream comprises a sequence of m-bit digital words, a range of values from 0 to $(2n)-1$ and from $2m-2n$ to $(2m)-1$ being excluded values on the channel, the video data stream having been produced by the method of claim 1, the method comprising:
   receiving j m-bit digital words containing supplementary bits over the channel;
   receiving $k*2**g$ m-bit digital words over the channel;
   performing subtraction modulo $2**m$ of the value s from the j m-bit digital words, and from the $k*2**g$ digital words;
   grouping data of the sequence of m-bit digital words into a group of $2**g$ digital words;
   detecting by the unmappinq controller, if a supplementary bit corresponding to the grouping is equal to zero, the unmappinq controller then copying the group of $2**g$ m-bit digital words in the video data stream;
   detecting by the unmappinq controller, if a supplementary bit corresponding to the grouping is equal to 1, the unmappinq controller then replacing the $(g+1)*2g$ bits having a value y by an equal number of bits having a value x through the inverse of the mapping of the set of possible values of x to the disjoint set of values y and copying the group of $2g$ m-bit digital words in the video data stream; and
   repeating, for k times, the grouping, the copying if the supplementary bit is equal to zero, and the replacing and copying if the supplementary bit is equal to 1.

10. A mapping controller for mapping a video data stream onto a serial data interface channel, wherein the video data stream represents compressed video data output by an encoder and wherein the video data stream comprises a sequence of m-bit digital words, a range of values from 0 to $(2n)-1$ and from $2m-2n$ to $(2m)-1$ being excluded values on the channel, the mapping controller configured for performing a method comprising:
   receiving the video data stream from the encoder;
   grouping data of the sequence of m-bit digital words into a group of $2**g$ digital words, wherein g is between 0 and m−1;
   detecting a first condition when at least one digital word of the group of $2**g$ digital words has g+1 most-significant bits (MSB bits) equal to 1;
   if the first condition is detected, then storing in memory a supplementary bit equal to 1 and recoding the g+1 MSB bits of the $2**g$ digital words by replacing $(g+1)*2**g$ bits having a value x by an equal number of bits having a value y by mapping the set of possible values of x to a disjoint set of values y for each of the $(g+1)*2**g$ bits, where each x value is mapped to a different y value;
   if the first condition is not detected, then storing in memory a supplementary bit equal to 0;
   repeating the grouping, the detecting of the first condition and the storing for k times to thereby store k supplementary bits;
   grouping the k supplementary bits into the least-significant bits (LSB bits) of a number j of m-bit digital words, wherein j is the integer part of $(k+m-2)/(m-1)$;

performing an addition modulo 2**m of a value s to the number j of m-bit digital words, and to k*2g m-bit digital words, where s is between 2n and (2m−2n)−Σ(2**(m−1−i)), where the sum is performed for i ranging from zero to g; and outputting the number j of m-bit digital words and the k*2**g m-bit digital words over the channel.

11. A mapping controller according to claim 10, wherein the mapping controller is configured to transmit 4K UHDTV frames at 60 FPS over a single 3G-SDI link.

12. A mapping controller according to claim 11, wherein the mapping controller includes a compression codec and the compression codec is a TICO codec.

13. An unmapping controller configured to unmap a video data stream from a serial data interface channel, wherein the unmapped video data stream represents compressed video data for output to a decoder and wherein the video data stream comprises a sequence of m-bit digital words, a range of values from 0 to (2n)−1 and from 2m−2n to (2m)−1 being excluded values on the channel, the unmappinq controller configured for performing a method comprising:

receiving j m-bit digital words containing supplementary bits over the channel;

receiving k*2**g m-bit digital words over the channel;

performing subtraction modulo 2**m of the value s from said j m-bit digital words, and from the k*2**g digital words;

grouping data of the sequence of m-bit digital words into a group of 2**g digital words;

if a supplementary bit corresponding to the grouping is equal to zero, copying the group of 2**g m-bit digital words;

if a supplementary bit corresponding to the grouping is equal to 1, replacing the (g+1)*2g bits having a value y by an equal number of bits having a value x through the inverse of a mapping of the set of possible values of x to a disjoint set of values y and copying the group of 2g m-bit digital words in the video data stream; and repeating, for k times, the grouping, the copying if the supplementary bit is equal to zero, and the replacing and copying if the supplementary bit is equal to 1.

14. An unmappinq controller according to claim 13, wherein the unmappinq controller is configured for receiving 4K UHDTV frames at 60 FPS over a single 3G-SDI link.

15. An unmappinq controller according to claim 11, wherein the unmappinq controller includes a decompression codec and the decompression codec is a TICO codec.

* * * * *